United States Patent
Yu

(10) Patent No.: US 11,943,379 B2
(45) Date of Patent: Mar. 26, 2024

(54) ELECTRONIC DEVICE INCLUDING FLEXIBLE DISPLAY AND CONTROL METHOD THEREOF

(71) Applicant: SAMSUNG ELECTRONICS CO., LTD., Suwon-si (KR)

(72) Inventor: Yeonsik Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 17/534,710

(22) Filed: Nov. 24, 2021

(65) Prior Publication Data
US 2022/0166866 A1  May 26, 2022

Related U.S. Application Data

(63) Continuation of application No. PCT/KR2021/017433, filed on Nov. 24, 2021.

(30) Foreign Application Priority Data

Nov. 26, 2020  (KR) .................. 10-2020-0161462
Aug. 19, 2021  (KR) .................. 10-2021-0109658

(51) Int. Cl.
*H04M 1/02* (2006.01)
*G06F 1/16* (2006.01)
(Continued)

(52) U.S. Cl.
CPC ........ *H04M 1/0268* (2013.01); *G06F 1/1624* (2013.01); *G06F 1/1652* (2013.01); *H01Q 1/243* (2013.01); *H04M 1/0237* (2013.01)

(58) Field of Classification Search
CPC ............. H04M 1/0268; H04M 1/0237; H04M 1/0235; G06F 1/1624; G06F 1/1652;
(Continued)

(56) References Cited

U.S. PATENT DOCUMENTS 9,985,353 B1 * 5/2018 Pajona .................... H01Q 1/48
10,747,269 B1  8/2020 Choi et al.
(Continued)

FOREIGN PATENT DOCUMENTS

KR  10-2007-0120950  12/2007
KR  10-2017-0081345   7/2017
(Continued)

OTHER PUBLICATIONS

International Search Report and Written Opinion dated Mar. 3, 2022 in corresponding International Application No. PCT/KR2021/017433.

*Primary Examiner* — Andrew Wendell
(74) *Attorney, Agent, or Firm* — Nixon & Vanderhye, P.C.

(57) ABSTRACT

An electronic device according to various embodiments of the disclosure may include: a first housing including a first conductive portion, a second conductive portion disposed to be spaced apart from one side of the first conductive portion, and a third conductive portion disposed to be spaced apart from another side of the first conductive portion, a second housing configured to perform slide movement with respect to the first housing, a flexible display connected to the second housing and configured to be extended or contracted in response to the slide movement, a first non-conductive member comprising a non-conductive material configured to electrically separate the first conductive portion and the second conductive portion from each other, a circuit board disposed inside the first housing and including a circuit disposed thereon, a fixing member comprising a conductive material configured to fix the circuit board to the first housing, and a switch disposed adjacent to the fixing member and configured to electrically connect or disconnect the circuit to or from at least a portion of the first housing.

20 Claims, 17 Drawing Sheets

(51) Int. Cl.
*H01Q 1/24* (2006.01)
*H04B 1/40* (2015.01)

(58) Field of Classification Search
CPC .... G06F 1/1658; G06F 1/1681; G06F 1/1698;
G06F 1/3218; G06F 1/3278; H01Q 1/243;
H01Q 1/241; H01Q 1/44; H01Q 5/357;
H01Q 9/0421; Y02D 10/00; H04B 1/04;
H04B 1/03; H04B 1/08; H04B 1/16;
H04B 1/40
See application file for complete search history.

(56) References Cited

U.S. PATENT DOCUMENTS

| | | | |
|---|---|---|---|
| 2008/0204367 | A1 | 8/2008 | Lafarre et al. |
| 2010/0328171 | A1 | 12/2010 | Mak et al. |
| 2011/0147075 | A1* | 6/2011 | Sugai .................... G06F 1/1616 |
| | | | 174/520 |
| 2013/0106666 | A1 | 5/2013 | Shan et al. |
| 2014/0210685 | A1 | 7/2014 | Chang et al. |
| 2017/0141820 | A1 | 5/2017 | Kim et al. |
| 2017/0196102 | A1 | 7/2017 | Shin et al. |
| 2017/0244153 | A1* | 8/2017 | Chen ....................... H01Q 13/10 |
| 2018/0248251 | A1* | 8/2018 | Son ......................... H01Q 21/28 |
| 2018/0358684 | A1 | 12/2018 | Chun et al. |
| 2019/0081386 | A1 | 3/2019 | Edwards et al. |
| 2019/0261519 | A1 | 8/2019 | Park et al. |
| 2019/0341688 | A1* | 11/2019 | Kim ........................ H01Q 1/243 |
| 2020/0076062 | A1 | 3/2020 | Lee et al. |
| 2020/0194894 | A1* | 6/2020 | Yanagi .................... H01Q 9/42 |
| 2021/0219437 | A1 | 7/2021 | Kim et al. |
| 2021/0314426 | A1 | 7/2021 | Jung et al. |
| 2021/0272486 | A1 | 9/2021 | Khachatryan et al. |
| 2021/0377372 | A1 | 12/2021 | Jung et al. |

FOREIGN PATENT DOCUMENTS

| | | |
|---|---|---|
| KR | 10-2019-0143029 | 12/2019 |
| KR | 20-2019-0143029 | 12/2019 |
| KR | 10-2020-0006645 | 1/2020 |
| KR | 10-2020-0017704 | 2/2020 |
| KR | 10-2020-0046399 | 5/2020 |
| KR | 10-2020-0101310 | 8/2020 |

* cited by examiner

ELECTRONIC DEVICE INCLUDING FLEXIBLE DISPLAY AND CONTROL METHOD THEREOF

CROSS-REFERENCE TO RELATED APPLICATIONS

This application is a continuation of International Application No. PCT/KR2021/017433 designating the United States, filed on Nov. 24, 2021, in the Korean Intellectual Property Receiving Office and claiming priority to Korean Patent Application No. 10-2020-0161462, filed on Nov. 26, 2020, in the Korean Intellectual Property Office and Korean Patent Application No. 10-2021-0109658, filed on Aug. 19, 2021, in the Korean Intellectual Property Office, the disclosures of all of which are incorporated by reference herein in their entireties.

BACKGROUND

Field

The disclosure relates to an electronic device including a flexible display and a method of controlling the electronic device.

Description of Related Art

Due to the remarkable development of information communication technology, semiconductor technology, and the like, the distribution and use of various electronic devices are rapidly increasing. In particular, recent electronic devices are being developed such that users are capable of communicating with each other while carrying the electronic devices.

An electronic device refers to a device that performs a specific function according to a program equipped therein, such as an electronic scheduler, a portable multimedia player, a mobile communication terminal, a tablet PC, an image/sound device, a desktop/laptop PC, or a vehicle navigation system, as well as a home appliance. The above-mentioned electronic devices may output, for example, information stored therein as sound or an image. As the degree of integration of electronic devices has increased and ultra-high-speed and large-capacity wireless communication has become popular, multiple functions have recently come to be provided in a single electronic device, such as a mobile communication terminal. For example, various functions, such as an entertainment function (e.g., a game function), a multimedia function (e.g., a music/video reproducing function), a communication and security function for mobile banking or the like, a schedule management function, and an e-wallet function, in addition to a communication function, have come to be integrated in a single electronic device. Such an electronic device is being miniaturized so that a user can conveniently carry the electronic device.

As the mobile communication service is extended to the multimedia service area, the sizes of the displays of electronic devices may be increased so as to allow the users to fully utilize the multimedia service as well as a voice call or short message service. Accordingly, a rollable flexible display may be disposed in a region of a housing separated to be slidable.

In an electronic device in which a flexible display is mounted to be rolled, an antenna structure may be disposed along a side surface of one housing structure such that an antenna beam is radiated toward the side surface of the electronic device irrespective of whether the flexible display is in an extended state or a contracted state, and some components of the electronic device, such as a circuit board, a housing, or a flexible display may serve as a ground of the antenna structure.

In an antenna structure disposed on a side surface of the electronic device, the ground of the antenna structure changes according to the size change of the flexible display according to the relative movement of the housing structure, and thus characteristics of the antenna are changed. In particular, in the characteristics of the antenna, an antenna radiation characteristic of a low frequency band may be deteriorated when the size of the flexible display is contracted.

SUMMARY

Embodiments of the disclosure provide an electronic device including a flexible display, in which it is possible to provide a structure of the electronic device capable of improving the antenna radiation characteristic of a low frequency band even when the size of the display is changed due to the relative movement of housings.

An electronic device according to various example embodiments of the disclosure may include: a first housing including: a first conductive portion, a second conductive portion disposed to be spaced apart from one side of the first conductive portion, and a third conductive portion disposed to be spaced apart from another side of the first conductive portion; a second housing configured to perform slide movement with respect to the first housing; a flexible display connected to the second housing and configured to be extended or contracted in response to the slide movement; a first non-conductive member comprising a non-conductive material configured to electrically separate the first conductive portion and the second conductive portion from each other, a circuit board disposed inside the first housing and including a circuit disposed thereon, a fixing member comprising a fastener configured to fix the circuit board to the first housing, and a switch disposed adjacent to the fixing member and configured to electrically connect or disconnect the circuit to or from at least a portion of the first housing.

An electronic device according to various example embodiments of the disclosure may include: a first housing including a first member comprising a conductive portion, a second member disposed to be spaced apart from one side of the first member and including a conductive portion, and a third member disposed to be spaced apart from another side of the first member and including a conductive portion, a second housing configured to perform slide movement with respect to the first housing, a flexible display connected to the second housing and configured to be extended or contracted in response to the slide movement, an antenna mounted on the first member, a circuit board disposed inside the first housing and including a circuit disposed thereon, the circuit board being electrically connected to the antenna, a fixing member comprising a fastener configured to fix the circuit board to the first housing, and a switch disposed adjacent to the fixing member and configured to electrically connect or disconnect the circuit board to or from at least a portion of the first housing.

According to various example embodiments of the disclosure, a method of controlling an electronic device is provided, the method comprising: controlling the electronic device to identify whether a flexible display is in an extended or a contracted state, wherein the electronic device includes a first housing including a first conductive portion, a second conductive portion disposed to be spaced apart from one side of the first conductive portion, and a third conductive portion disposed to be spaced apart from another side of the first conductive portion, a second housing configured to perform slide movement with respect to the first housing, the flexible display connected to the second housing and configured to be extended or contracted in response to the slide movement, a first non-conductive member including a non-conductive material configured to electrically separate the first conductive portion and the second conductive portion from each other, a circuit board disposed inside the first housing and including a circuit disposed thereon, a fixing member including a fastener configured to fix the circuit board to the first housing, and a switch disposed adjacent to the fixing member and configured to electrically connect or disconnect the circuit to or from at least a portion of the first housing, and controlling the switch to be open or to be closed based on whether the flexible display is in the extended or the contracted state.

An electronic device including a plurality of housings (e.g., a first housing and a second housing) according to various example embodiments of the disclosure makes it possible to include a structure in which an antenna ground is variable such that radiation performance is not impaired even by physical deformation between the housings.

In an electronic device including a plurality of housings (e.g., a first housing and a second housing) according to various example embodiments of the disclosure, it is possible to improve characteristics of an antenna by including a structure in which an antenna ground is variable.

In an electronic device including a plurality of housings (e.g., a first housing and a second housing) according to various example embodiments of the disclosure, it is possible to use an existing antenna structure without adding an antenna by including a structure in which an antenna ground is variable.

Effects that can be obtained in the disclosure are not limited to those described above, and other effects not described above will be clearly understood by a person ordinarily skilled in the art to which the disclosure belongs based on the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
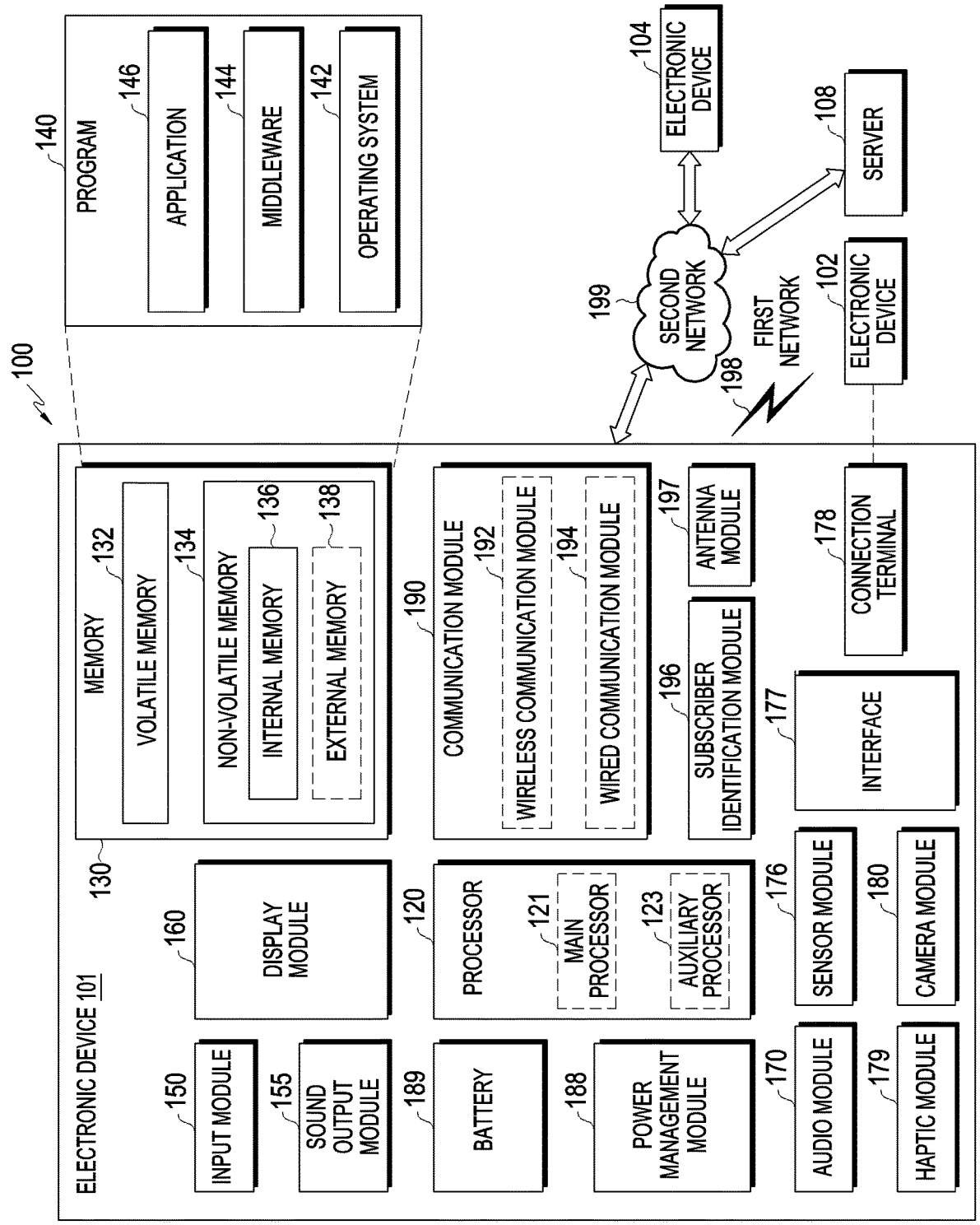
FIG. 1 is a block diagram of illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
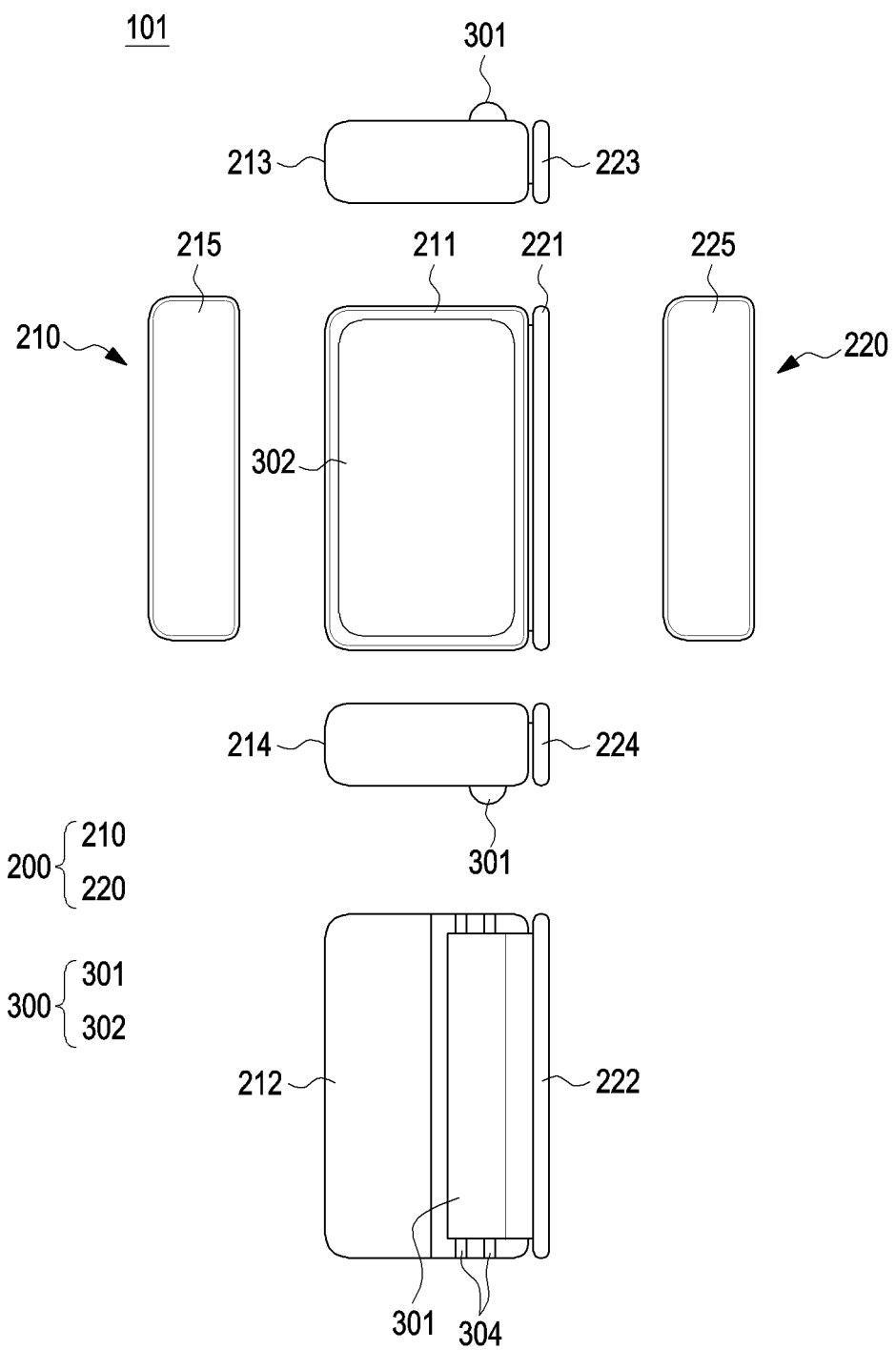
FIG. 2 is a diagram illustrating an electronic device in a closed state according to various embodiments.
Figure 3:
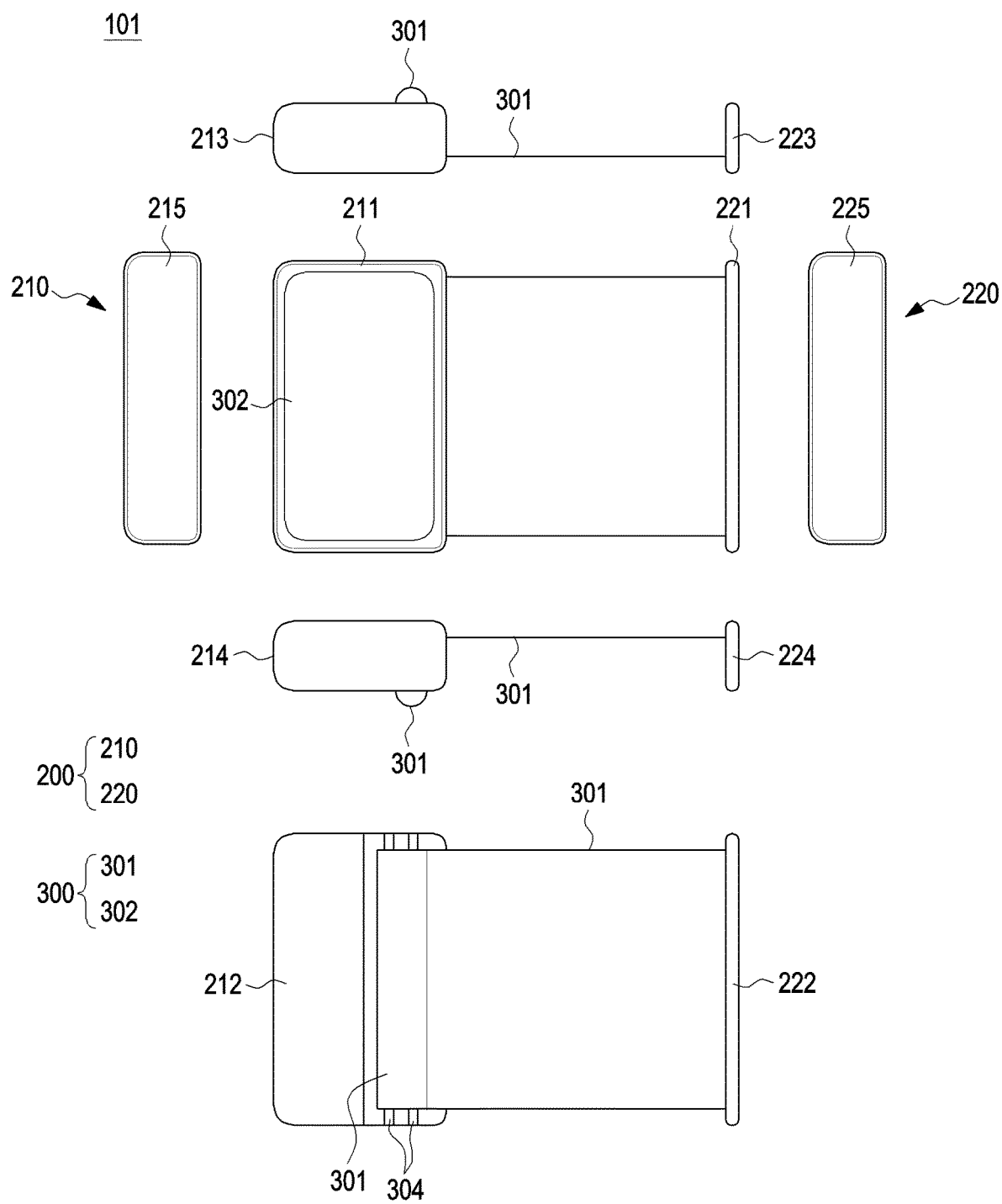
FIG. 3 is a diagram illustrating an electronic device in an open state according to various embodiments.

FIG. 2 is a diagram illustrating an electronic device in a closed state according to various embodiments. FIG. 3 is a diagram illustrating the electronic device in an open state according to various embodiments.

Referring to FIGS. 2 and 3, according to various embodiments, the electronic device 101 may include a housing 200 and a display 300 (e.g., the display module 160 in FIG. 1). The housing 200 may include a first housing 210 and a second housing 220. The second housing 220 is capable of performing slide movement with respect to the first housing 210. The display 300 may include a flexible display 301 (hereinafter, simply referred to as a "display"), which is connected to the second housing 220 and is extendible or contractible in response to the sliding movement and a sub-display 302 disposed outside the first housing 210.

According to various embodiments, the surface on which the display 301 is disposed is defined as the front surface of the electronic device 101. The surface opposite to the front surface is defined as the rear surface of the electronic device 101. In addition, the surface surrounding the space between the front surface and the rear surface is defined as the side surface of the electronic device 101.

According to various embodiments, the first housing 210 may include a first front cover 211, a first rear cover 212, a first upper portion 213, a first lower portion 214, and a first left portion 215. The second housing 220 may include a second front surface 221, a second rear surface 222, a second upper surface 223, a second lower surface 224, and a second right surface 225.

According to various embodiments, the second housing 220 is slidable relative to the first housing 210. The state of the electronic device 101 is variable according to the slide movement and is defined as follows.

The state of the electronic device 101 according to various embodiments illustrated in FIG. 2 is the state in which the display 301 is accommodated in the housing 200, and may be defined as a "first position", a "closed state" or an "accommodated state". The state of the electronic device 101 according to various embodiments illustrated in FIG. 3 is the state in which the second housing 220 slides relative to the first housing 210 so that a screen display region of the flexible display 301 is at least partially or substantially exposed to an external space, and may be defined as a "second position", an "open state" or an "extended state".

While the state of the electronic device 101 according to various embodiments is changed from the open state to the closed state, the display 301 may be deformed into a curved shape. While the state of the electronic device 101 is changed from the closed state to the open state, the display 301 may be deformed into a flat plate shape. As the first housing 210 and the second housing 220 move relative to each other, the display 301 may be accommodated in the housing 200 or pulled out of the housing 200, and depending on the relative positions of the first housing 210 and the second housing 220, the display 301 may at least partially form a curved shape or a flat plate shape. When it is described that the display 301 has a flat plate shape, it may refer, for example, to the display being in the state in which the display 301 has a curved shape not exceeding a predetermined curvature. Inside the housing 200, the display 301 may at least partially have a curved shape. For example, the display 301 inside the housing 200 may be rolled to have a cylindrical shape. The display 301 may be exposed in the rear surface or disposed to protrude to the outside of the housing 200. The arrangement of the display 301 is not limited thereto. In an embodiment, the display 301 may be disposed such that the display 301 is not exposed from the rear surface or does not protrude to the outside of the housing 200.

According to various embodiments, in the electronic device 101 in the closed state, the second housing 220 may function as a right side cover of the first housing 210. In addition, the first housing 210 may function as a left side cover of the second housing 220.

According to various embodiments, the first front cover 211 may cover the front surface of the first housing 210. According to an embodiment, the first front cover 211 may cover the second front surface 221 of the second housing 220. That is, the first front cover 211 may function as a front cover of the housing 200.

The housing 200 of the electronic device 101 according to various embodiments is not limited to the shape and assembly illustrated in FIGS. 2 and 3, and may be implemented by a combination and/or assembly of other shapes or components. In an embodiment, the first housing 210 may include a first right portion (not illustrated). In an embodiment, the first rear cover 212, the first upper portion 213, the first lower portion 214, and the first left portion 215 may be integrally formed.

According to various embodiments, although not illustrated, the housing 200 may include a partially transparent region. For example, even in the state in which the display 301 is accommodated in the housing 200, the display 301 may output a screen through a portion of the housing 200, and a user is able to recognize the output screen through the transparent region of the housing 200. Although not illustrated, various key input devices, sound holes, opening areas for cameras, and/or connector holes may be disposed outside the housing 200. Various key input devices, sound holes, camera opening regions, and/or connector holes may be disposed in appropriate numbers and at appropriate positions in consideration of the external appearance of the electronic device 101.

According to various embodiments, the housing 200, e.g., the first housing 210 and the second housing 220, may be formed of a metallic material (e.g., an alloy including aluminum or magnesium) and/or a non-metallic material (e.g., glass, polymer, or ceramic). The material of the housing 200 may be appropriately selected in consideration of factors, such as rigidity required to protect the external appearance of the electronic device 101, internal electrical components (e.g., components such as a communication module, a memory, a display module, a camera module, or a connection terminal in FIG. 1) or ease of molding or machining. The housing 200 may partially include an electrically conductive material, and the portion made of the electrically conductive material may function as an antenna (e.g., the antenna module 197 in FIG. 1). In some embodiments, a portion of the housing 200 may be made of transparent glass or polymer, and the transparent portion may visually expose a portion of the display 301 accommodated in the housing 200. For example, even in the state in which the display 301 is accommodated in the housing 200, the electronic device 101 may provide visual information through the display 301.

According to various embodiments, the display 300 may include, for example, a display panel (e.g., the displays 301 and 302 in FIG. 2 or FIG. 3) made of an organic light emitting diode (OLED) and may be used as an output device (e.g., the display module 160 in FIG. 1) and as an input device (e.g., the input module 150 in FIG. 1) by including a touch screen function.

Figure 4A:
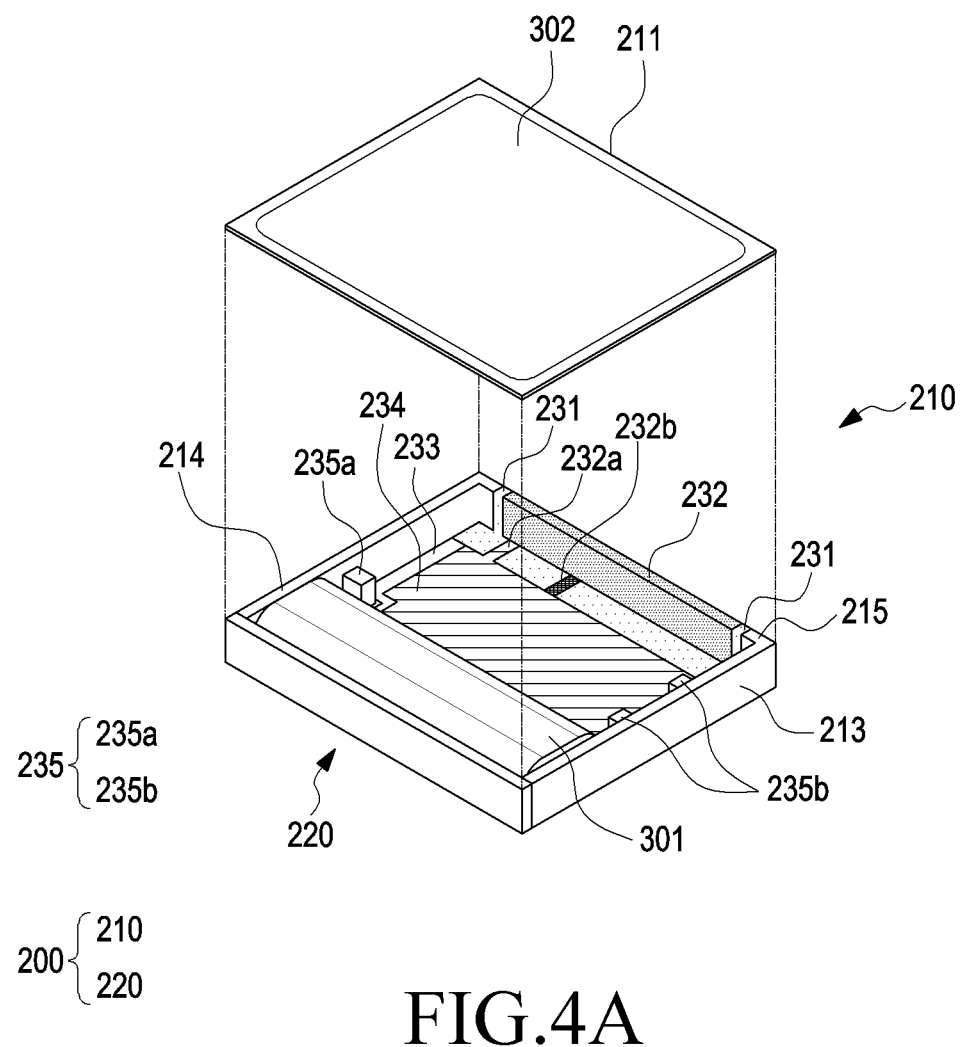
FIGS. 4A and 4B are exploded perspective views illustrating an electronic device in the closed state and open state, respectively, in which the front cover of the electronic device is disassembled according to various embodiments.
Figure 4B:
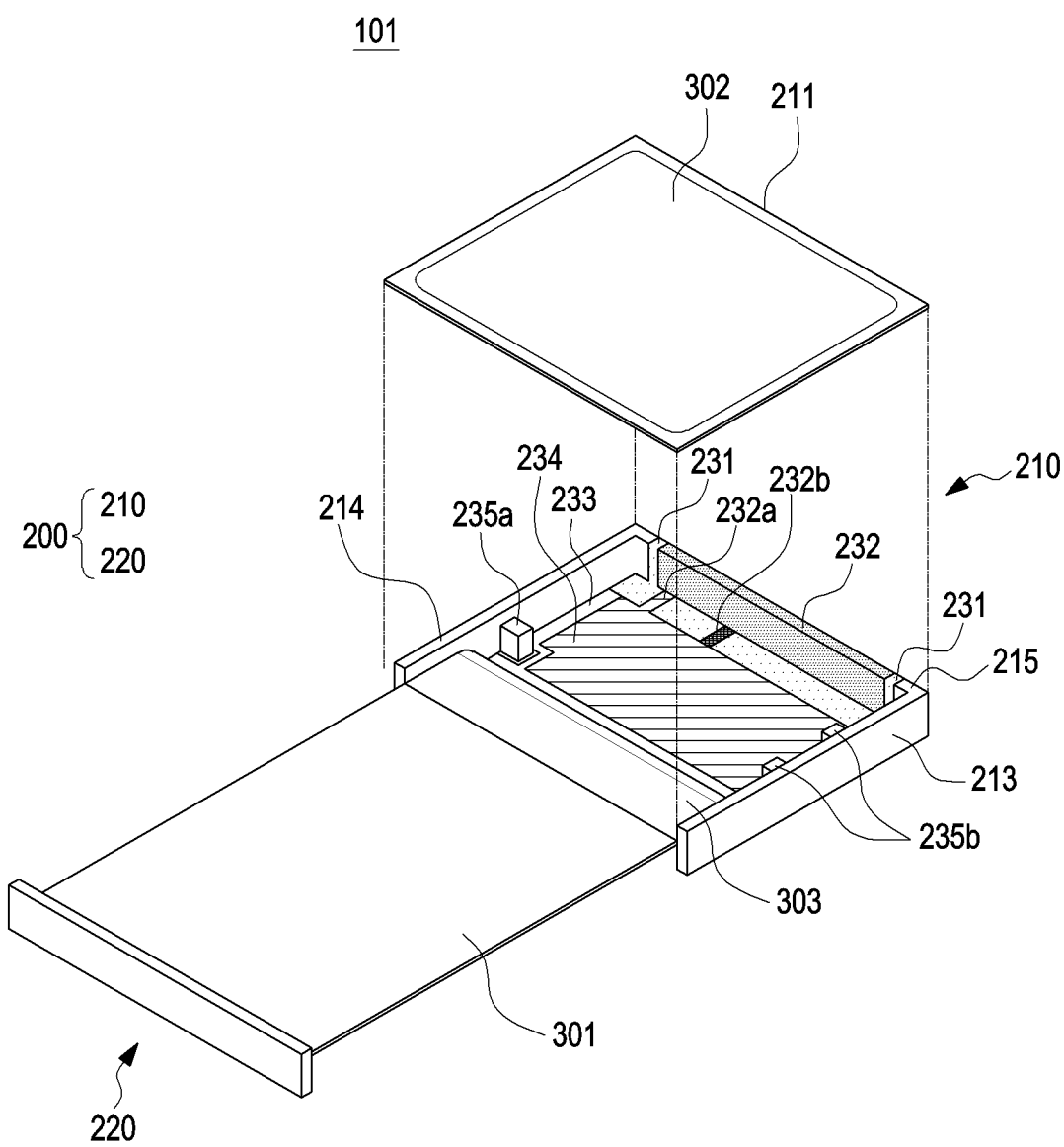

FIGS. 4A and 4B are exploded perspective views illustrating an electronic device according to various embodiments of the disclosure in the closed state and open state, respectively, in which the front cover of the electronic device is disassembled.

The front cover of the electronic device 101 according to various embodiments may be configured with a first front cover 211. In an embodiment, the front cover may be configured with a first front cover 211 and a second front cover (not illustrated). Hereinafter, the front cover of the electronic device 101 will be described based on an embodiment in which the front cover is configured with the first front cover 211.

According to various embodiments, inside the housing 200, a first non-conductive member 231, an antenna 232, a circuit board 233, a circuit 234, a fixing device 235, a display 301, and a display roller board 303, and a display roller structure 304 may be disposed.

According to various embodiments, a portion of the housing 200 may be made of a conductive material and may function as the antenna 232. According to an embodiment, a portion of the housing 200 may be made of a non-conductive material, and the antenna 232 configured in a laser direct structuring (LDS) structure may be mounted on the portion of the housing 200.

According to various embodiments, the antenna 232 may be disposed on the first left portion 215. Accordingly, a portion of the first left portion 215 made of a conductive material may function as the antenna 232. The position of the antenna 232 is not limited to being disposed on the first left portion 215 and may be disposed at other positions. For example, the antenna 232 may be disposed on the first rear cover 212, the first upper portion 213, or the first lower portion 214. The antenna 232 may include a ground 232*a* and a power-feeding portion 232*b*. The ground 232*a* may be electrically connected to the circuit 234 of the circuit board 233, and the circuit 234 may function as a ground. The power-feeding portion 232*b* may be electrically connected to the circuit 234 of the circuit board 233, and may receive power from the circuit 234 connected to the battery 240. According to an embodiment, an antenna configured in an LDS structure may be mounted on the first left portion 215.

According to various embodiments, the first non-conductive member 231 may be disposed on a portion adjacent to the antenna 232. The first non-conductive member 231 is a member that does not conduct electricity, and may be made of, for example, a non-conductive material such as plastic or rubber. According to an embodiment, the first non-conductive member 231 may be formed of double-injection molded plastic. Due to the first non-conductive member 231, the antenna 232 may be electrically separated from some of the first front cover 211, the first rear cover 212, the first upper portion 213, the first lower portion 214, and the first left portion 215. In addition, due to the first non-conductive member 231, the first lower portion 214 may be spaced apart from the first rear cover 212. Furthermore, due to the first non-conductive member 231, the first left portion 215 and the first rear cover 212 may be spaced apart from each other.

According to various embodiments, the circuit board 233 may be disposed inside the housing 200, and the circuit 234 may be arranged on the circuit board 233. The circuit 234 may be arranged in the manner of being printed on the circuit board 233. The circuit 234 may be connected to the antenna 232, a ground 232a, and a power-feeding portion 232b. The ground 232a may be disposed adjacent to the lower end of the first left portion 215, and the power-feeding portion 232b may be disposed above the ground 232a. The positions of the ground 232a and the power-feeding portion 232b are not limited thereto, and may be changed according to the position of the antenna 232. Accordingly, the power-feeding portion 232b may be disposed below the ground 232a.

Since the ground 232a of the antenna 232 and the circuit 234 are connected to each other, the circuit board 233 and the circuit 234 may function as a ground of the antenna 232. In addition, since the circuit 234 may be electrically connected to the display 301 and the display roller board 303, the display 301, the display roller board 303, and the display roller structure 304 may function as a ground. This will be described in greater detail below with reference to FIGS. 6A, 6B and 6C.

According to various embodiments, the fixing device 235 may be disposed inside the housing 200. The fixing device 235 may fix the circuit board 233 inside the housing 200. The fixing device 235 may include a conductive member. The fixing device 235 may include a lower fixing device 235a disposed on the first lower portion 214 and an upper fixing device 235b disposed on the first upper portion 213. The position of the fixing device 235 is not limited to the first upper portion 213 and the first lower portion 214, and may be disposed at other positions.

According to various embodiments, the display roller board 303 is disposed inside the housing 200 and is electrically connected to the display 301. The display roller board 303 may include a circuit capable of controlling the display 301. The display roller board 303 may be electrically connected to the first housing 210 or the circuit 234. Accordingly, the display 301 or a portion of the display roller board 303 may function as a ground.

Figure 5A:
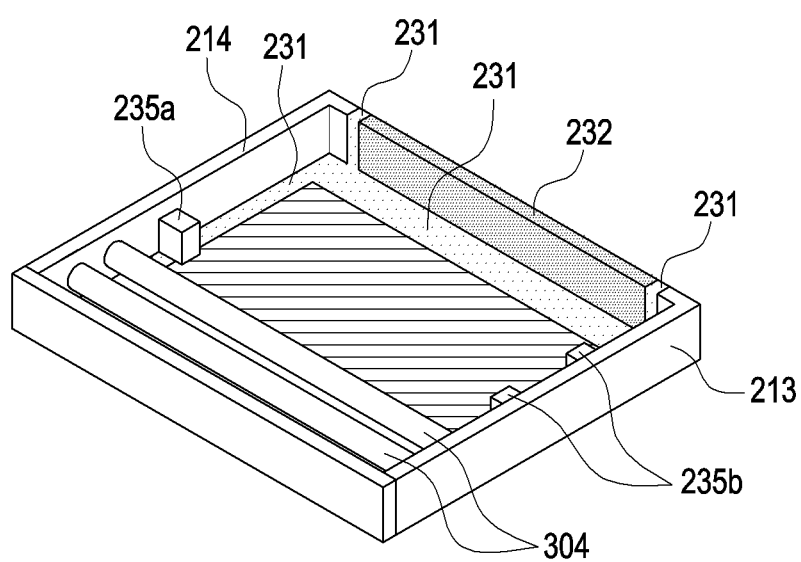
FIGS. 5A, 5B and 5C are a perspective view and diagrams illustrating an example structure of an electronic device in which the front cover, a circuit board, a circuit, and a display are excluded according to various embodiments.
Figure 5B:
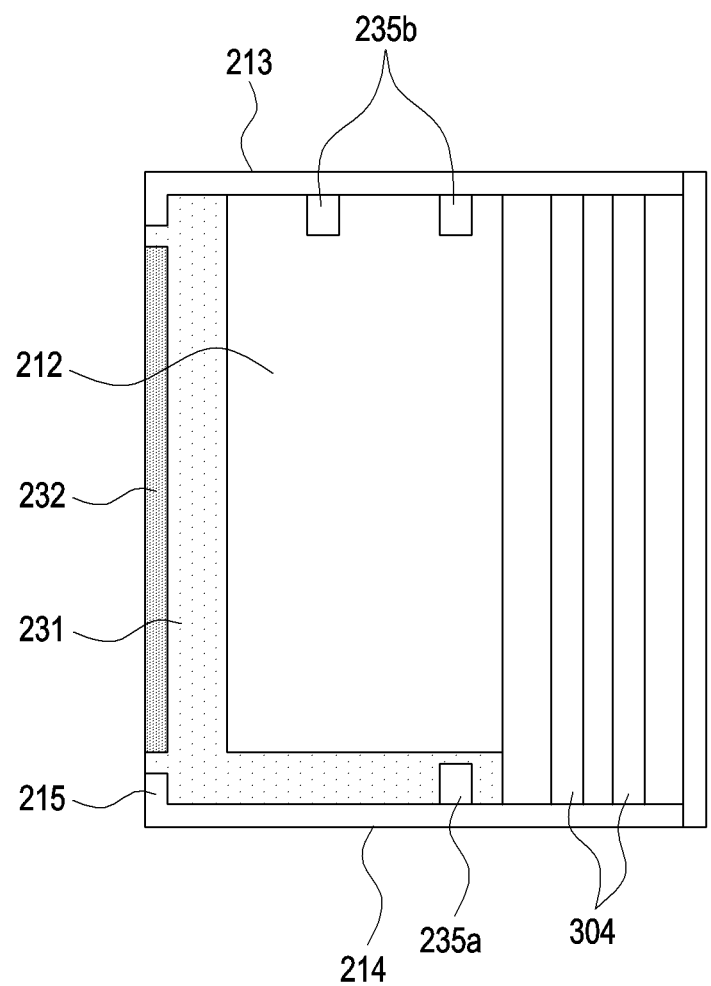
Figure 5C:
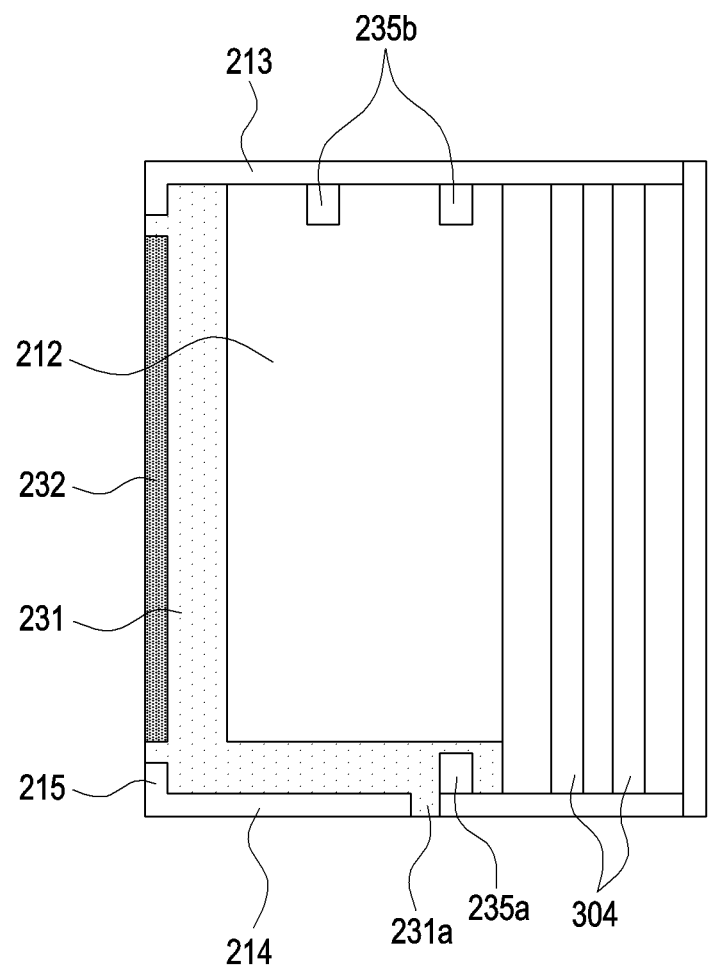

FIGS. 5A, 5B and 5C are a perspective view and plan views illustrating the structure of an electronic device according to various embodiments of the disclosure in which the front cover, a circuit board, a circuit, and a display are excluded.

According to various embodiments (referring to FIGS. 2, 3, 4A and 4B), the electronic device 101 may include a first housing 210, a second housing 220, a first non-conductive member 231, an antenna 232, a circuit board 233, a circuit 234, a fixing device 235, a display 300, a display roller board 303, and a display roller structure 304. The first housing 210, the second housing 220, the first non-conductive member 231, the antenna 232, the circuit board 233, the circuit 234, the fixing device 235, the display 300, the display roller board 303, and the display roller structure 304 of FIGS. 5A, 5B and 5C may be all or partially the same as the first housing 210, the second housing 220, the first non-conductive member 231, the antenna 232, the circuit board 233, the circuit 234, the fixing device 235, the display 300, the display roller board 303, and the display roller structure 304 of FIGS. 2 to 4B.

Referring to FIGS. 5A, 5B and 5C, the internal structure of the electronic device 101 may be more easily understood. According to various embodiments, the first non-conductive member 231 may be disposed at opposite sides of the antenna 232. Accordingly, the antenna 232 may be disposed to be spaced apart from a portion of the first left portion 215 by the first non-conductive member 231. In addition, the first non-conductive member 231 may be disposed to extend inside the housing 200, so that the antenna 232 and the first rear cover 212 may be spaced apart from each other by the first non-conductive member 231. Furthermore, the first non-conductive member 231 may be disposed between the first lower portion 214 and the first rear cover 212, so that the first lower portion 214 and the first rear cover 212 may be spaced apart from each other by the first non-conductive member 231.

According to various embodiments, the fixing device 235 fixes the circuit board 233 inside the housing 200. The fixing device 235 may include a lower fixing device 235a and an upper fixing device 235b. The fixing device 235 may include a conductive member. The lower fixing device 235a may be connected to the first lower portion 214, and the circuit board 233 may be disposed inside the housing 200. The lower fixing device 235a may be electrically connected to the circuit 234 of the circuit board 233 by a switch (e.g., the switch 236 in FIG. 6) to be described later. Accordingly, the first lower portion 214 and the circuit 234 may be electrically connected to each other by the lower fixing device 235a and the switch 236 (refer, e.g., to FIGS. 6B and 6C). The upper portion fixing device 235b may be connected to the first upper portion 213 and may be disposed inside the housing 200. The upper fixing device 235b may be electrically connected to the circuit 234. Accordingly, the circuit 234 and the first upper portion 213 may be electrically connected to each other. The position of the fixing device 235 is not limited to the shape and assembly illustrated in the drawings, and may be disposed at other positions.

According to various embodiments, the display roller structure 304 may be disposed between the first upper portion 213 and the first lower portion 214 and may be configured to wind the display 301. Accordingly, when the electronic device 101 is in the closed state, the display 301 may be wound along the display roller structure 304 in a curved shape to be accommodated in the housing 200. The display roller structure 304 may be electrically connected to the first upper portion 213 and the first lower portion 214. In addition, the display roller structure 304 may be electrically connected to the display roller board 303. In addition, the display roller board 303 may be electrically connected to the circuit 234 via a connection circuit 234a. Accordingly, the display roller structure 304 may function as a ground for the antenna 232.

Referring to FIG. 5C, a second non-conductive member 231a may be disposed on the first lower portion 214 according to various embodiments. The second non-conductive member 231a may be connected to the first non-conductive member 231. The second non-conductive member 231a may be disposed on a portion of the first lower portion 214. In addition, the second non-conductive member 231a may be disposed adjacent to the lower fixing device 235a. Accordingly, the first lower portion 214 may be electrically separated from the second non-conductive member 231a. Due to the second non-conductive member 231a, a portion of the first lower portion 214 can be reliably electrically separated from the antenna 232. Accordingly, it is possible to prevent and/or avoid a portion of the first lower portion 214 from being electrically coupled to the antenna 232, the first rear cover 212, or the circuit 234.

Figure 6A:
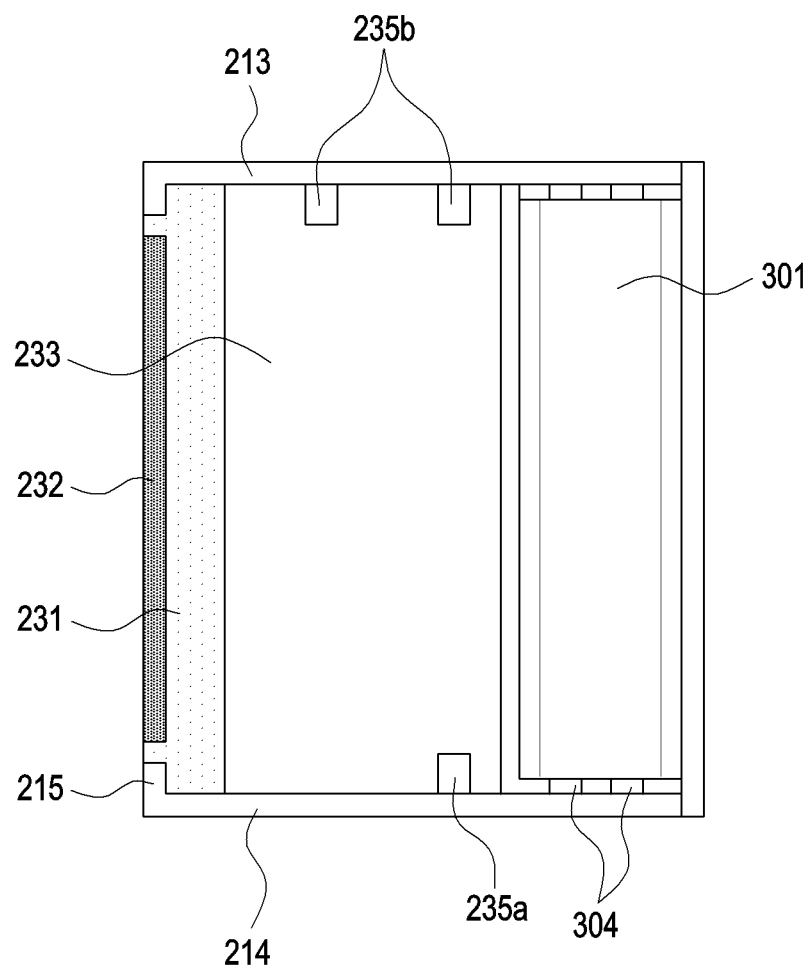
FIGS. 6A, 6B and 6C are a diagram and cross-sectional views illustrating an example of a circuit board and a circuit disposed on the circuit board and a rollable display disposed in an electronic device according to various embodiments.
Figure 6B:
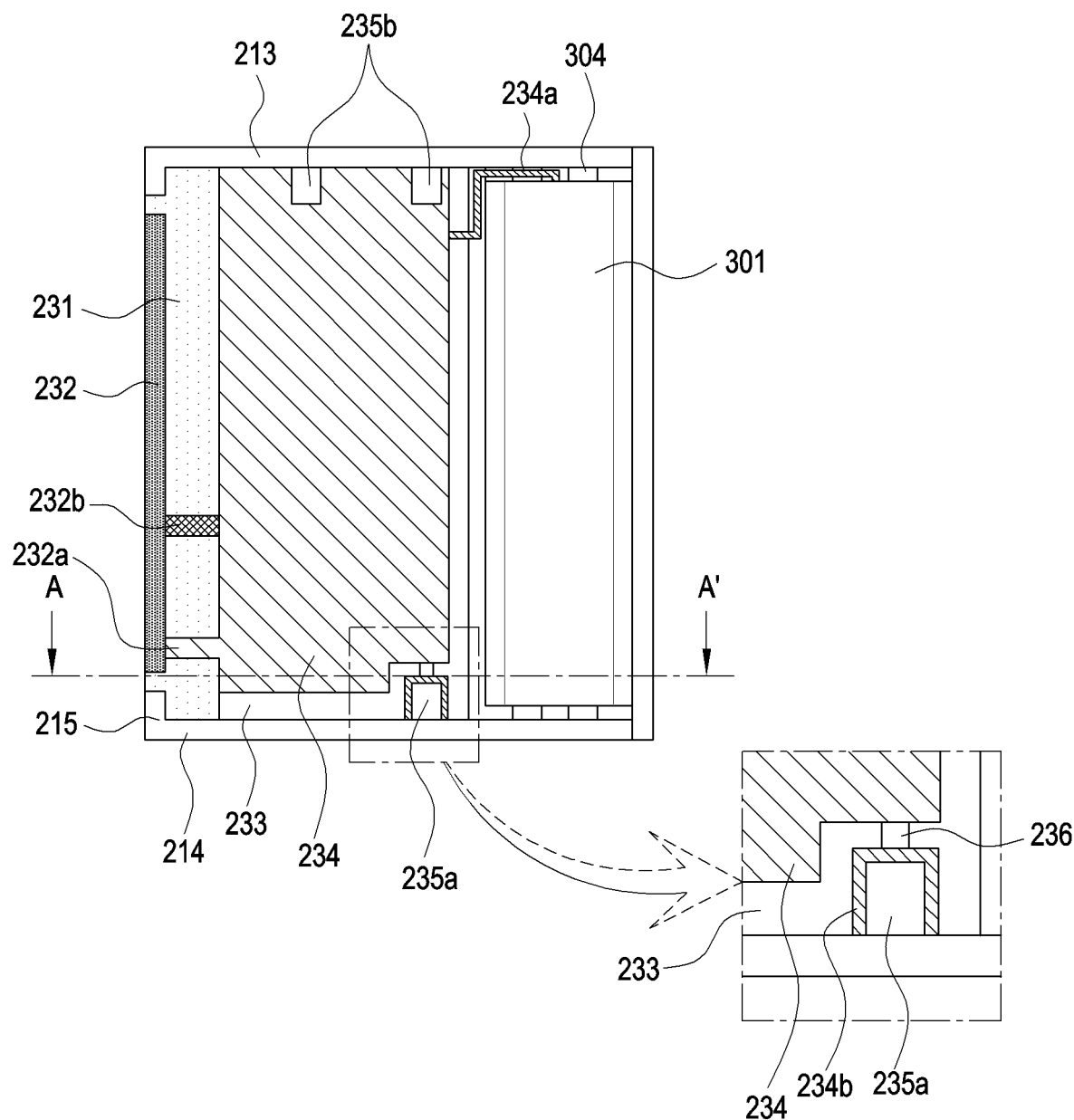
Figure 6C:
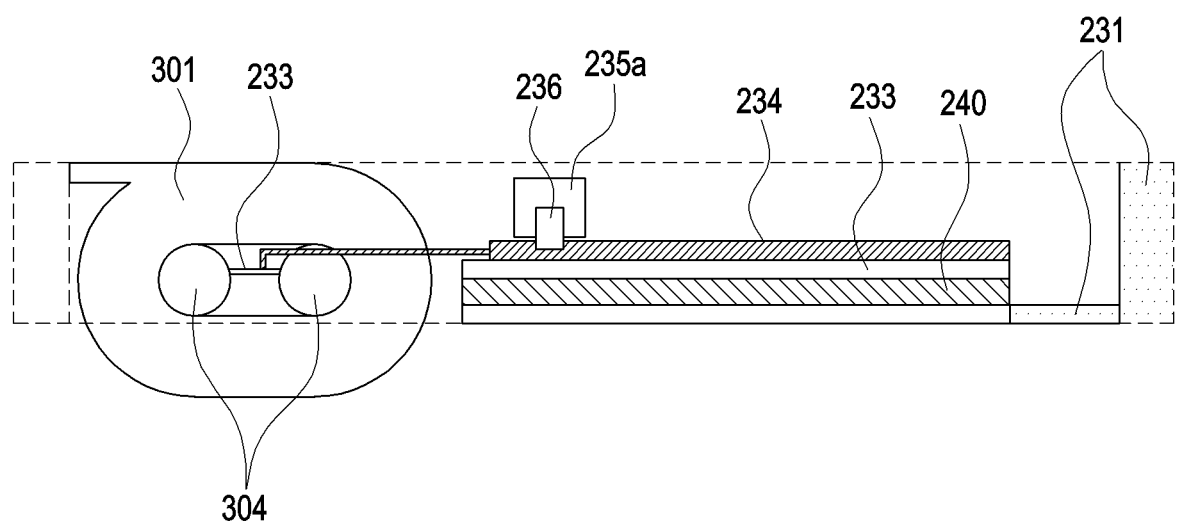

FIGS. 6A, 6B and 6C are plan views and a cross-sectional view illustrating an example of a circuit board and a rollable display disposed in an electronic device according to various embodiments, and a circuit disposed on the circuit board.

According to various embodiments (referring to FIGS. 2, 3, 4A, 4B, 5A, 5B and 5C), the electronic device 101 may include a first housing 210, a second housing 220, a first non-conductive member 231, an antenna 232, a circuit board 233, a circuit 234, a fixing device 235, a display 300, a display roller board 303, and a display roller structure 304. The first housing 210, the second housing 220, the first non-conductive member 231, the antenna 232, the circuit board 233, the circuit 234, the fixing device 235, the display 300, the display roller board 303, and the display roller structure 304 of FIGS. 6A, 6B and 6C may be all or partially the same as the first housing 210, the second housing 220, the first non-conductive member 231, the antenna 232, the circuit board 233, the circuit 234, the fixing device 235, the display 300, the display roller board 303, and the display roller structure 304 of FIGS. 2 to 5C.

Referring to FIG. 6A, according to various embodiments, the circuit board 233 is disposed inside the first housing 210 and fixed between the fixing device 235 and the first rear cover 212. The circuit board 233 may be disposed to be spaced apart from the antenna 232 by the first non-conductive member 231.

Referring to FIG. 6B, the circuit 234 may be disposed on the circuit board 233 according to various embodiments. The circuit 234 may be electrically connected to the antenna 232 via the ground 232a and the power-feeding portion 232b of the antenna 232. As described above, the positions of the ground 232a and the power-feeding portion 232b are not limited and may be changed. For example, the positions of the ground 232a and the power-feeding portion 232b may be changed depending on the position of the antenna 232. In addition, the ground 232a and the power-feeding portion 232b may be disposed at positions where a flow of ground current, which will be described later, is formed long.

According to various embodiments, the circuit 234 and the upper fixing device 235b may be electrically connected to each other. Accordingly, the circuit 234 and the first upper portion 213 may be electrically connected to each other via the upper fixing device 235b. In addition, the circuit 234 may be electrically connected to the display roller board 303 via the connection circuit 234a. Accordingly, the circuit 234 may be connected to the display roller board 303 via the upper fixing device 235b, the first upper portion 213 and the display roller structure 304. Alternatively, the circuit 234 may be connected to the display roller board 303 via the connection circuit 234a. Accordingly, the display 301, the display roller board 303, and the display roller structure 304 may function as a ground.

According to various embodiments, a fixing device circuit 234b may be disposed adjacent to the lower fixing device 235a. The lower fixing device 235a and the fixing device circuit 234b may be electrically connected to each other. The fixing device circuit 234b may be disposed to be spaced apart from the circuit 234. A switch 236 may be disposed between the fixing device circuit 234b and the circuit 234. According to an embodiment, the switch 236 may be disposed to be connected to the lower fixing device 235a and may be disposed between the lower fixing device 235a and the circuit 234. The switch 236 may include a semiconductor such as a transistor. The type of the switch 236 is not limited to the semiconductor, and the switch 236 may be selected as a configuration that is capable of being "shorted", "closed" or "switched on" or "open" or "switched off". According to various embodiments, the switch 236 may be controlled by the processor 120. Under the control of the processor 120, the switch 236 disposed between the lower fixing device 235a or the fixing device circuit 234b and the circuit 234 may be shorted or open. Since the circuit 234 may function as a ground, when the switch 236 is shorted, a portion of the first lower portion 214 may also function as a ground, and when the switch 236 is open, the portion of the first lower portion 214 cannot function as a ground. Accordingly, the first lower portion 214 may be connected to the circuit 234 by the switch 236 via the lower fixing device 235a or via the lower fixing device 235a and the fixing device circuit 234b to form a short length of ground current or may be open to form a long length of ground current. Antenna characteristics of the electronic device 101 change depending on a ground change of the electronic device 101, and the change in antenna characteristics will be described in greater detail below with reference to FIGS. 7A, 7B, 8A, 8B, 9A and 9B.

FIG. 6C is a cross-sectional view of the electronic device taken along line A-A' in FIG. 6B. Referring to FIG. 6C, according to various embodiments, a battery 240 may be disposed between the circuit board 233 and the first rear cover 212. The position of the battery 240 is not limited thereto, and may be disposed inside, outside, or over the inside and outside of the housing 200.

According to various embodiments, the display 301 may be electrically connected to the display roller board 303, and may be wound by the display roller structure 304 to be disposed in the housing 200. The display 301 may be disposed to be exposed to the outside in the rear surface of the electronic device 101. The display 301 is not limited to being disposed to be exposed to the outside in the rear surface of the electronic device 101. The display 301 may be disposed not to be exposed to the outside in the rear surface of the electronic device 101, and the length of the first rear cover 212 may correspond to the length of the first upper portion 213 and the first lower portion 214.

Figure 7A:
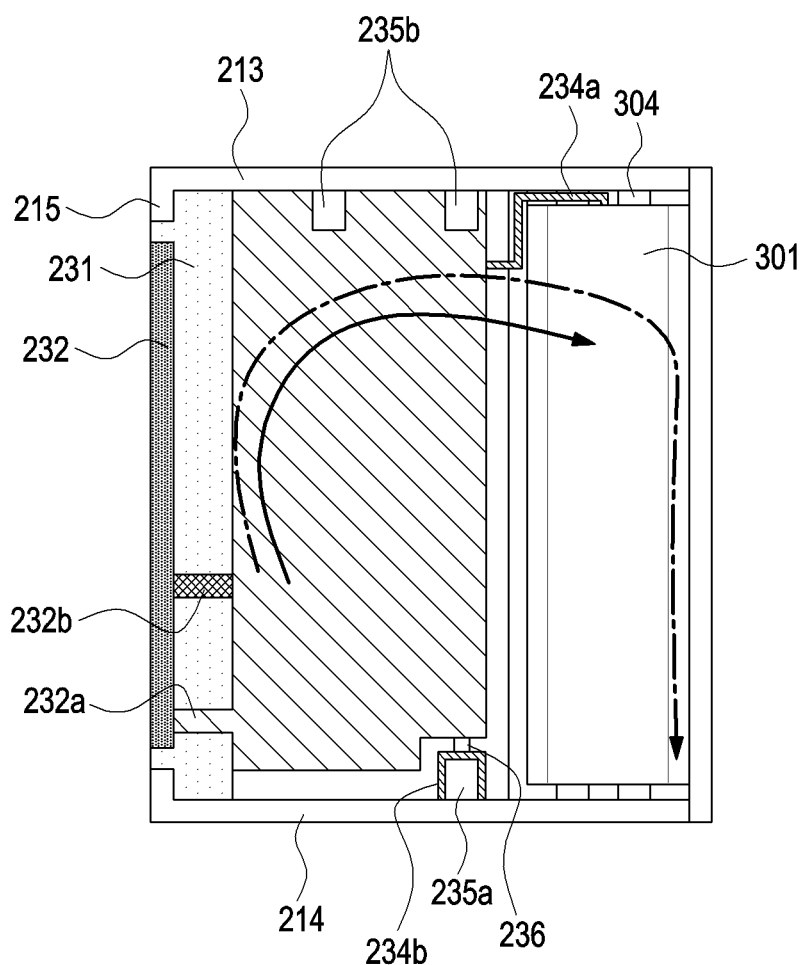
FIG. 7A is a diagram illustrating, in a simplified manner, ground current flows according to shorting or opening of a switch in an electronic device in the closed state according to various embodiments.
Figure 7B:
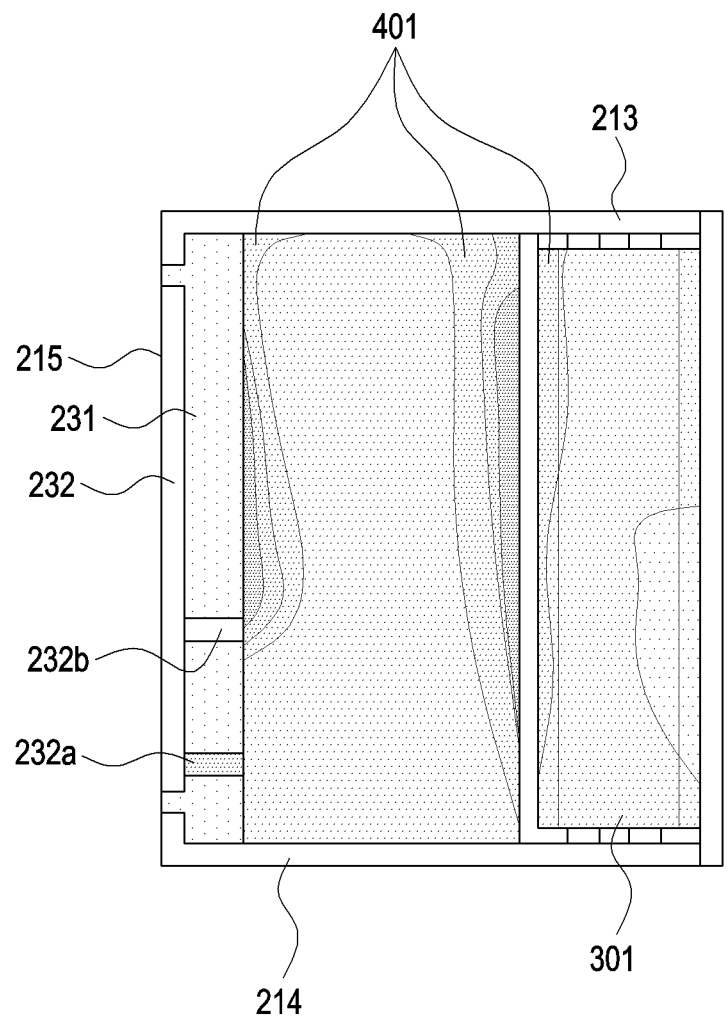
FIG. 7B is a diagram illustrating a ground current flow simulation when the switch is open in the electronic device in the closed state according to various embodiments.

FIG. 7A is a diagram illustrating, in a simplified manner, ground current flows according to shorting or opening of a switch in an electronic device in the closed state according to various embodiments, and FIG. 7B is a diagram illustrating a ground current flow simulation when the switch is open in the electronic device in the closed state according to various embodiments.

According to various embodiments (referring to FIGS. 2, 3, 4A, 4B, 5A, 5B, 6A, 6B and 6C), the electronic device 101 may include a first housing 210, a second housing 220, a first non-conductive member 231, an antenna 232, a circuit board 233, a circuit 234, a fixing device 235, a display 300, a display roller board 303, and a display roller structure 304. The first housing 210, the second housing 220, the first non-conductive member 231, the antenna 232, the circuit board 233, the circuit 234, the fixing device 235, the display 300, the display roller board 303, and the display roller structure 304 of FIGS. 7A and 7B may be all or partially the same as the first housing 210, the second housing 220, the first non-conductive member 231, the antenna 232, the circuit board 233, the circuit 234, the fixing device 235, the display 300, the display roller board 303, and the display roller structure 304 of FIGS. 2 to 6C.

FIG. 7A is a diagram illustrating, in a simplified manner, a flow of ground current in the electronic device according to various embodiments of the disclosure in the closed state according to the shorted state and the open state of the switch 236. The flow of ground current in the state in which the switch 236 according to various embodiments is shorted is indicated by a solid line. The flow of ground current in the circuit 234 may be formed to the display roller board 303 and the display 301 via the connection circuit 234a or via the first upper portion 213. The flow of ground current in the circuit 234 may be connected to the display roller board 303 and the display 301 through the coupling of the circuit 234 and the display 301. The flow of ground current in the state in which the switch 236 is shorted appears from the ground 232a to a portion of the display 301 adjacent to the first upper portion 213 via a portion adjacent to the first upper portion 213.

According to various embodiments, in the open state of the switch 236, the flow of ground current is indicated by an alternated long and short dash line. In the state in which the switch 236 is open, the flow of ground current may be formed from the ground 232a to a portion of the display 301 adjacent to the first lower portion 214 via a portion adjacent to the first upper portion 213. Accordingly, the flow of ground current in the state in which the switch 236 is open may be formed longer than the flow of ground current in the state in which the switch 236 is shorted. As the ground current flow is formed longer, a sufficient current length compared to a wavelength of a low-frequency band can be secured, and thus the reception rate of the low frequency band by the antenna 232 is improved. Referring to FIG. 7B, it is possible to confirm a ground current flow simulation result in the state in which the switch 236 is open in the electronic device 101 in the closed state.

FIG. 7B shows a ground current flow simulation result in the state in which the switch 236 is open in the electronic device 101 in the closed state. In the ground current flow simulation results, the ground current in the circuit 234 is disposed in a first region 401 including the first left portion 215, the first upper portion 213, the first lower portion, and a portion of the display 301 adjacent to the first lower portion 214. Accordingly, compared to the circuit 234 in which the switch 236 is open, in the circuit 234 in which the switch 236 is shorted, a current distribution having a sufficient length compared to the wavelength of the low-frequency band can be secured. Accordingly, when the switch 236 is open in the electronic device 101 in the closed state, the reception rate of the low-frequency band radio waves can be improved.

Figure 8A:
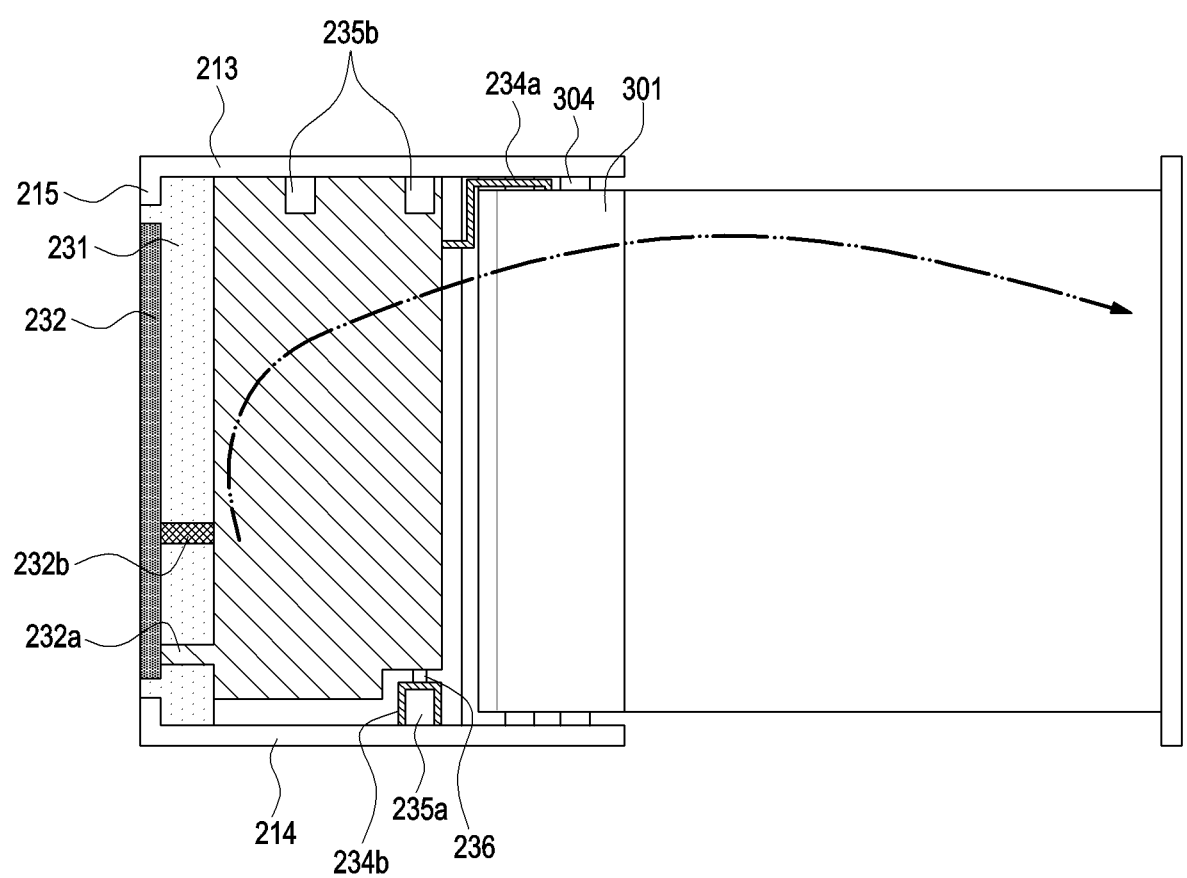
FIG. 8A is a diagram illustrating, in a simplified manner, a ground current flow in an electronic device in the closed state according to various embodiments.
Figure 8B:
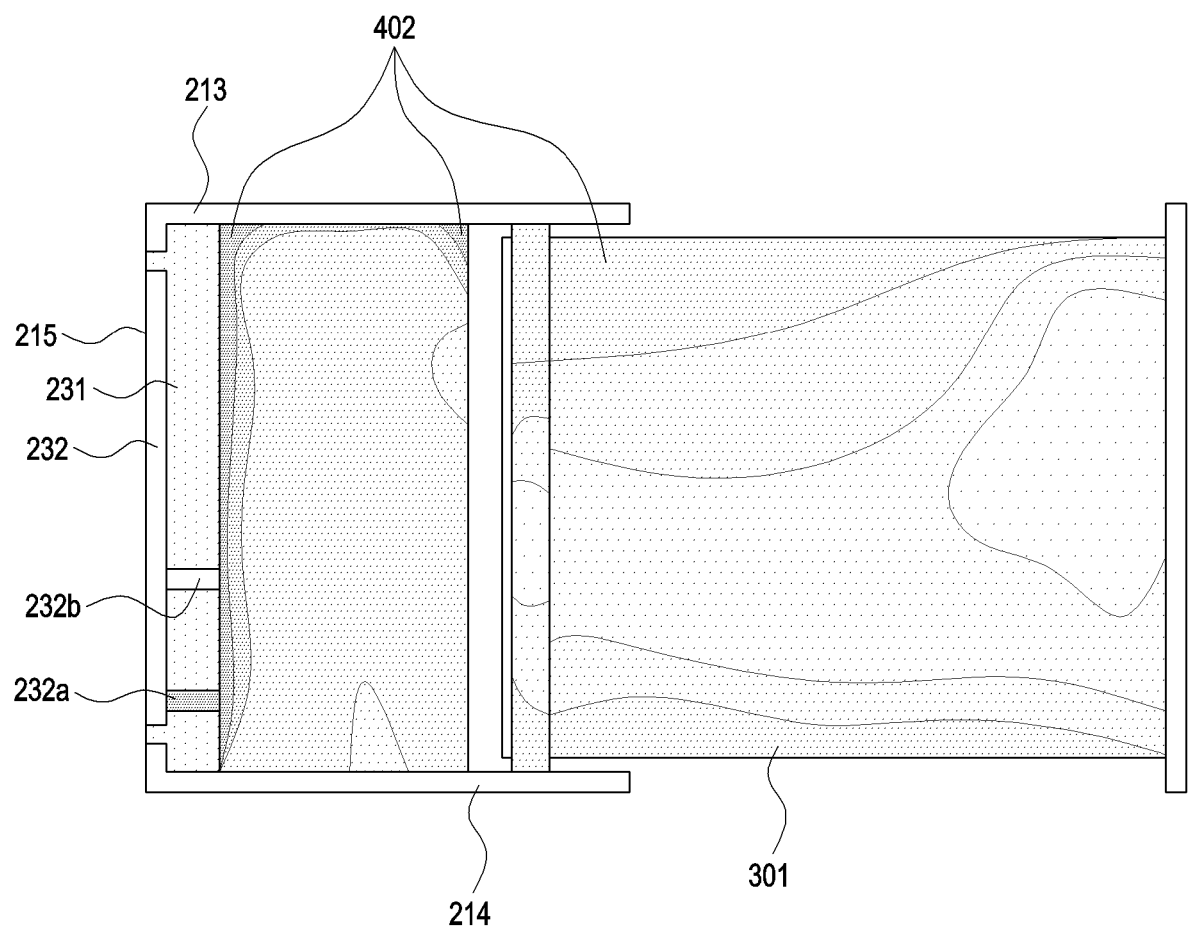
FIG. 8B is a diagram illustrating a ground current flow simulation when in the electronic device in the open state according to various embodiments.

FIG. 8A is a diagram illustrating, in a simplified manner, a ground current flow in the electronic device in the open state according to various embodiments, and FIG. 8B is a diagram illustrating a ground current flow simulation in the electronic device in the open state according to various embodiments.

According to various embodiments (referring to FIGS. 2, 3, 4A, 4B, 5A, 5B, 6A, 6B and 6C), the electronic device 101 may include a first housing 210, a second housing 220, a first non-conductive member 231, an antenna 232, a circuit board 233, a circuit 234, a fixing device 235, a display 300, a display roller board 303, and a display roller structure 304. The first housing 210, the second housing 220, the first non-conductive member 231, the antenna 232, the circuit board 233, the circuit 234, the fixing device 235, the display 300, the display roller board 303, and the display roller structure 304 of FIGS. 8A and 8B may be all or partially the same as the first housing 210, the second housing 220, the first non-conductive member 231, the antenna 232, the circuit board 233, the circuit 234, the fixing device 235, the display 300, the display roller board 303, and the display roller structure 304 of FIGS. 2 to 6C.

FIG. 8A is a diagram illustrating, in a simplified manner, a flow of ground current according to the electronic device 101 according to various embodiments of the disclosure in the open state. In the electronic device 101 in the open state, the flow of ground current is indicated by an alternate long and two short dashes line. The flow of ground current in the circuit 234 may be formed to the display roller board 303 and the display 301 via the connection circuit 234a or via the first upper portion 213. The flow of ground current in the circuit 234 may be connected to the display roller board 303 and the display 301 through the coupling of the circuit 234 and the display 301. In the electronic device 101 in the open state, a flow of ground current may be formed from the ground 232a to a portion of the display 301 via a portion adjacent to the first upper portion 213. Accordingly, the flow of ground current in the electronic device 101 in the open state may be formed longer than the ground current flow in the electronic device 101 in the closed state. As the ground current flow is formed longer, a sufficient current length compared to a wavelength of a low-frequency band can be secured, and thus the reception rate of the low frequency band by the antenna 232 is improved. Referring to FIG. 8B, it is possible to confirm a ground current flow simulation result.

FIG. 8B is a diagram illustrating a ground current flow simulation result in the electronic device 101 in the open state. In the ground current flow simulation result, the ground current in the circuit 234 is distributed in a second region 402 including the first left portion 215, the first upper portion 213, and the upper portion of the display 301. Accordingly, compared to the electronic device 101 in the closed state, in the electronic device 101 in the open state, a current distribution having a sufficient length compared to the wavelength of the low-frequency band can be secured. Accordingly, the reception rate of the low frequency band radio waves by the electronic device 101 in the open state can be improved.

Figure 9A:
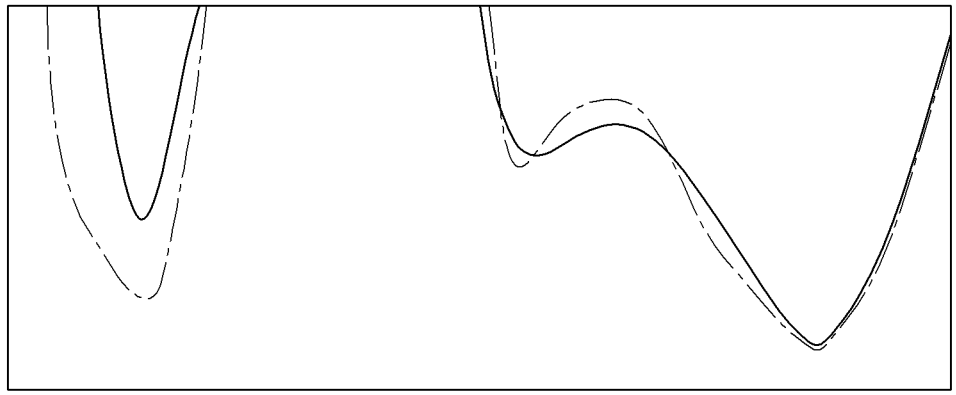
FIG. 9A is a graph showing antenna radiation characteristics according to shorting or opening of a switch in an electronic device in the closed state according to various embodiments.
Figure 9B:
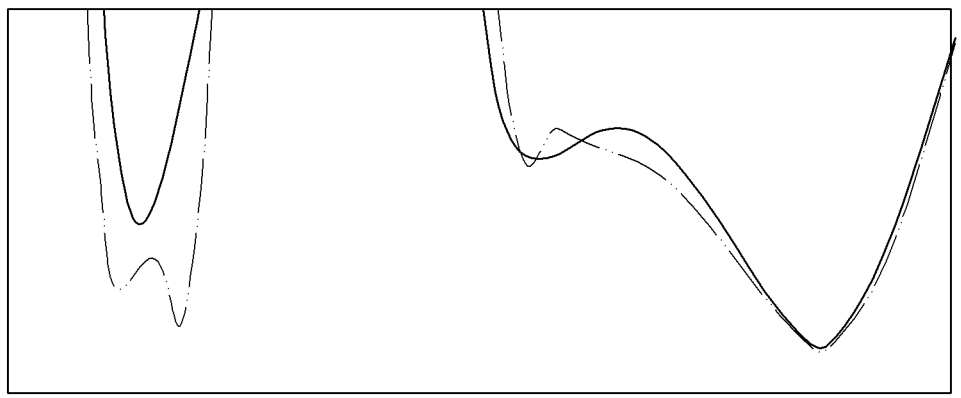
FIG. 9B is a graph showing antenna radiation characteristics according to the closed state and the open state of the electronic device according to various embodiments.

FIG. 9A is a graph showing antenna radiation characteristics according to shorting or opening of a switch in an electronic device in the closed state according to various embodiments, and FIG. 9B is a graph showing antenna radiation characteristics according to the closed state and the open state of the electronic device according to various embodiments of the disclosure.

In the graphs of FIGS. 9A and 9B, the x-axis represents a frequency expressed in the unit of gigahertz (GHz), and the y-axis represents a voltage standing wave ratio (VSWR) value. The VSWR may refer, for example, to the ratio of the maximum amplitude to the minimum amplitude of a voltage (Vmax/Vmin) in a standing wave. It can be understood that the lower the VSWR value, the better the antenna receives radio waves.

FIG. 9A is a graph showing antenna characteristics according to shorting or opening of the switch 236 in the electronic device 101 according to various embodiments of the disclosure in the closed state, which will be described with reference to FIGS. 7A and 7B. When the switch 236 is shorted in the electronic device 101 in the closed state, the ground current of the electronic device 101 may flow along the solid line illustrated in FIG. 7A. In this case, the ground current may have a length insufficient compared to the wavelength of the low frequency band. In contrast, when the switch 236 is open in the electronic device 101 in the closed state, the ground current of the electronic device 101 may flow along the alternated long and short dash line illustrated in FIG. 7A. The length of the ground current in the state in which the switch 236 is open may be longer than the length of the ground current in the state in which the switch 236 is shorted. Since the ground current becomes longer, the reception rate of the low frequency band by the electronic device 101 can be improved. In addition, the width of the low-frequency band that can be received by the electronic device 101 can be widened. Referring to the graphs of the solid line and the alternated long and short dash line illustrated in FIG. 9A, it can be seen that in the low-frequency band (about 0.7 GHz to 1.4 GHz), the graph of the alternated long and short dash line indicates that at the same frequency, the reception rate is higher than that indicated by the solid line and the received frequency range is wider than that indicated by the solid line. For example, at a frequency of 1 GHz, the VSWR value of the solid line is about 6, and the VSWR value of the alternated long and short dash line is about 3. In addition, at a frequency of 0.6 GHz, the VSWR value of the solid line is 10 or more, and the VSWR value of the alternated long and short dash line is about 6. Accordingly, in the electronic device 101 in the closed state, when the switch 236 is open, the radio wave reception rate in the low-frequency band may be improved compared to when the switch 236 is shorted.

FIG. 9B is a graph showing antenna characteristics of the electronic device 101 according to various embodiments of the present disclosure in the closed state or the open state, which will be described with reference to FIGS. 7A, 8A, and 8B. The ground current of the electronic device 101 in the closed state may flow along the solid line illustrated in FIG. 7A. In this case, the ground current may have a length insufficient compared to the wavelength of the low frequency band. In contrast, the ground current of the electronic device 101 in the open state may flow along the alternated long and two short dashes line illustrated in FIG. 8A. The length of the ground current of the electronic device 101 in the open state may be longer than the length of the ground current of the electronic device 101 in the closed state. Since the ground current becomes longer, the reception rate of the low frequency band by the electronic device 101 can be improved. In addition, the width of the low-frequency band that can be received by the electronic device 101 can be widened. Referring to the graphs of the solid line and the alternated long and two short dashes line illustrated in FIG. 9B, it can be seen that in the low-frequency band (about 0.7 GHz to 1.4 GHz), the graph of the alternated long and two short dashes line indicates that at the same frequency, the reception rate is higher than that indicated by the solid line and the received frequency range is wider than that indicated by the solid line. For example, at a frequency of 1 GHz, the VSWR value of the solid line is about 6, and the VSWR value of the alternated long and short dash line is about 2. In addition, at a frequency of 0.7 GHz, the VSWR value of the solid line is 10 or more, and the VSWR value of the alternated long and short dash line is about 6. Accordingly, the electronic device 101 in the open state may have a higher radio wave reception rate in the low-frequency band than the electronic device 101 in the closed state.

Figure 10:
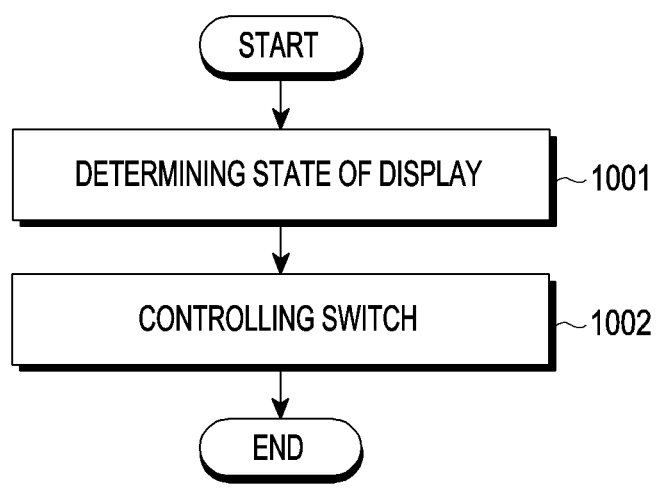
FIG. 10 is a flowchart illustrating an example switch control operation according to state determination of an electronic device according to various embodiments.

FIG. 10 is a flowchart illustrating an example switch control operation according to state determination of an electronic device according to various embodiments.

Referring to FIG. 10, according to various embodiments, in operation 1001, the electronic device 101 may perform control to identify the state of the display 301 of the electronic device 101. For example, the electronic device 101 may perform control to identify whether the display 301 is contracted and the electronic device 101 is in the closed state or whether the display 301 is extended and the electronic device 101 is in the open state.

According to various embodiments, in operation 1002, the electronic device 101 may control the switch 236 to be open or to be shorted based on the state of the electronic device 101. For example, when it is identified that the display 301 is contracted and the electronic device 101 is in the closed state, the electronic device 101 may control the switch 236 to be open. In addition, when it is identified that the display 301 is extended and the electronic device 101 is in the open state, the electronic device 101 may control the switch 236 to be shorted.

According to various embodiments, the electronic device 101 may control the switch 236 to be open or to be shorted based on the reception state of the antenna 232. For example, when it is determined that the radio wave reception rate in the low-frequency band is lower than a predetermined value, the electronic device 101 may control the switch 236 to be open. In addition, when it is identified that the radio wave reception rate in the high-frequency band is lower than a predetermined value, the electronic device 101 may control the switch 236 to be shorted.

According to various embodiments, when it is identified that a characteristic change of the antenna 232 is required, the electronic device 101 may control the switch 236 to be open or to be shorted.

An electronic device (e.g., an electronic device (101) in FIGS. 1 to 3) according to various example embodiments of the disclosure may include: a first housing (e.g., a first housing (210) in FIG. 4b) including a first conductive portion (e.g., a first conductive portion (215) in FIG. 4b), a second conductive portion (e.g., a second conductive portion (214) in FIG. 4b) disposed to be spaced apart from one side of the first conductive portion, and a third conductive portion (e.g., a third conductive portion (213) in FIG. 4b) disposed to be spaced apart from another side of the first conductive portion, a second housing (e.g., a second housing (220) in FIG. 4b) configured to perform slide movement with respect to the first housing, a flexible display (e.g., a flexible display (301) in FIG. 4b) connected to the second housing and configured to be extended or contracted in response to the slide movement, a first non-conductive member (e.g., a first non-conductive member (231) in FIG. 4b) comprising a non-conductive material configured to electrically separate the first conductive portion and the second conductive portion from each other, a circuit board (e.g., a circuit board (233) in FIG. 4b) disposed inside the first housing and including a circuit (e.g., a circuit (234) in FIG. 4b) disposed thereon, a fixing member (e.g., a fixing member (235) in FIG. 4b) comprising a conductive material configured to fix the circuit board to the first housing, and a switch (e.g., a switch (236) in FIG. 4b) disposed adjacent to the fixing member and configured to electrically connect or disconnect the circuit to or from at least a portion of the first housing.

According to various example embodiments, the first non-conductive member may be disposed at opposite sides of the first conductive portion.

According to various example embodiments, a second non-conductive member (e.g., a second non-conductive member (231a) in FIG. 6b) comprising a non-conductive material may be disposed on a portion of the second conductive portion, and the second non-conductive member may be connected to the first non-conductive member.

According to various example embodiments, the electronic device may further include a processor, and the processor may be configured to control the switch to electrically connect or disconnect the circuit to or from the second conductive portion of the first housing.

According to various example embodiments, the electronic device may further include a processor, and the processor may be configured to control the switch to electrically connect or disconnect the circuit to or from the fixing member.

According to various example embodiments, the switch may include a semiconductor.

According to various example embodiments, the third conductive portion may be electrically connected to the second housing.

According to various example embodiments, the circuit may be electrically connected to the flexible display.

According to various example embodiments, the electronic device may further include a processor, and the processor may be configured to control the switch to be open in a state in which the flexible display is contracted.

According to various example embodiments, the electronic device may further include a processor, and the processor may be configured to control the switch to be shorted in a state in which the flexible display is extended.

According to various example embodiments, the electronic device may further include a processor, and the processor may be configured to control the electronic device to identify whether the flexible display is extended or contracted.

An electronic device (e.g., an electronic device (101) in FIGS. 1 to 3) according to various example embodiments of the disclosure may include: a first housing (e.g., a first housing (210) in FIG. 4b) including a first member (e.g., a first conductive portion (215) in FIG. 4b) comprising a conductive material, a second member (e.g., a second conductive portion (214) in FIG. 4b) comprising a conductive material disposed to be spaced apart from one side of the first member (e.g., a first conductive portion (215) in FIG. 4b), and a third member (e.g., a third conductive portion (213) in FIG. 4b) comprising a conductive material disposed to be spaced apart from another side of the first member, a second housing (e.g., a second housing (220) in FIG. 4b) configured to be capable of performing slide movement with respect to the first housing, a flexible display (e.g., a flexible display (301) in FIG. 4b) connected to the second housing and configured to be extended or contracted in response to the slide movement, an antenna (e.g., an antenna (232) in FIG. 6b) mounted on the first member, a circuit board (e.g., a circuit board (233) in FIG. 4b) disposed inside the first housing, including a circuit (e.g., a circuit (234) in FIG. 4b) disposed thereon, and electrically connected to the antenna, a fixing member (e.g., a fixing member (235) in FIG. 4b) comprising a conductive material configured to fix the circuit board to the first housing, and a switch (e.g., a switch (236) in FIG. 4b) disposed adjacent to the fixing member and configured to electrically connect or disconnect the circuit board to or from at least a portion of the first housing.

According to various example embodiments, the circuit may be electrically connected to the flexible display.

According to various example embodiments, the electronic device further includes a processor, wherein the processor may be configured to control the switch to electrically connect or disconnect the circuit to or from the conductive portion of the second member.

According to various example embodiments, the switch may include a semiconductor.

According to various example embodiments, the third member may be electrically connected to the second housing.

According to various example embodiments, the electronic device may further include a processor, and the processor may be configured to control the switch to be open in a state in which the flexible display is contracted.

According to various example embodiments of the disclosure, a method of controlling an electronic device (e.g., an electronic device (101) in FIGS. 1 to 3) comprising: controlling the electronic device to identify whether a flexible display (e.g., a flexible display (301) in FIG. 4b) is in an extended or a contracted state, wherein the electronic device including a first housing (e.g., a first housing (210) in FIG. 4b) including a first conductive portion (e.g., a first conductive portion (215) in FIG. 4b), a second conductive portion (e.g., a second conductive portion (214) in FIG. 4b) disposed to be spaced apart from one side of the first conductive portion, and a third conductive portion (e.g., a third conductive portion (213) in FIG. 4b) disposed to be spaced apart from another side of the first conductive portion, a second housing (e.g., a second housing (220) in FIG. 4b) configured to perform slide movement with respect to the first housing, the flexible display connected to the second housing and configured to be extended or contracted in response to the slide movement, a first non-conductive member (e.g., a first non-conductive member (231) in FIG. 4b) comprising a non-conductive material configured to electrically separate the first conductive portion and the second conductive portion from each other, a circuit board (e.g., a circuit board (233) in FIG. 4b) disposed inside the first housing and including a circuit (e.g., a circuit (234) in FIG. 4b) disposed thereon, a fixing member (e.g., a fixing member (235) in FIG. 4b) comprising a conductive material configured to fix the circuit board to the first housing, and a switch (e.g., a switch (236) in FIG. 4b) disposed adjacent to the fixing member and configured to electrically connect or disconnect the circuit to or from at least a portion of the first housing, and controlling the switch to be open or to be shorted based on whether the flexible display is in the contracted state or in the extended state.

According to various example embodiments, an operation in which the switch is controlled to be open based on identifying that the flexible display is in the contracted state may be included.

According to various example embodiments, an operation in which the switch is controlled to be shorted based on identifying that the flexible display 301 is in the extended state may be included.

While the disclosure has been illustrated and described with reference to various example embodiments, it will be understood that the various example embodiments are intended to be illustrative, not limiting. It will be further understood by one skilled in the art that various modifications can be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing including a first conductive portion, a second conductive portion disposed to be spaced apart from one side of the first conductive portion, and a third conductive portion disposed to be spaced apart from another side of the first conductive portion;
a second housing configured to perform slide movement with respect to the first housing;
a flexible display connected to the second housing and configured to be extended or contracted in response to the slide movement;
a first non-conductive member comprising a non-conductive material configured to electrically separate the first conductive portion and the second conductive portion from each other;
a circuit board disposed inside the first housing and including a circuit disposed thereon;
a fixing member comprising a conductive material configured to fix the circuit board to the first housing; and
a switch disposed adjacent to the fixing member and configured to electrically connect or disconnect the circuit to or from at least a portion of the first housing.

2. The electronic device of claim 1, wherein the first non-conductive member is disposed on opposite sides of the first conductive portion.

3. The electronic device of claim 1, wherein a second non-conductive member is disposed on a portion of the second conductive portion, and the second non-conductive member is connected to the first non-conductive member.

4. The electronic device of claim 1, further comprising:
a processor,
wherein the processor is configured to control the switch to electrically connect or disconnect the circuit to or from the second conductive portion of the first housing.

5. The electronic device of claim 1, further comprising:
a processor,
wherein the processor is configured to control the switch to electrically connect or disconnect the circuit to and from the fixing member.

6. The electronic device of claim 1, wherein the switch includes a semiconductor.

7. The electronic device of claim 1, wherein the third conductive portion is electrically connected to the second housing.

8. The electronic device of claim 1, wherein the circuit is electrically connected to the flexible display.

9. The electronic device of claim 1, further comprising:
a processor,
wherein the processor is configured to control the switch to be open in a state in which the flexible display is in a contracted state.

10. The electronic device of claim 1, further comprising:
a processor,
wherein the processor is configured to control the switch to be shorted based on the flexible display being in an extended state.

11. The electronic device of claim 1, further comprising:
a processor,
wherein the processor is configured to control the electronic device to identify whether the flexible display is extended or contracted.

12. An electronic device comprising:
a first housing including a first member comprising a conductive material, a second member comprising a conductive material disposed to be spaced apart from one side of the first member and including a conductive portion, and a third member comprising a conductive material disposed to be spaced apart from another side of the first member and including a conductive portion;
a second housing configured to perform slide movement with respect to the first housing;
a flexible display connected to the second housing and configured to be extended or contracted in response to the slide movement;
an antenna mounted on the first member;
a circuit board disposed inside the first housing and including a circuit disposed thereon, the circuit board being electrically connected to the antenna;
a fixing member comprising a conductive material configured to fix the circuit board to the first housing; and
a switch disposed adjacent to the fixing member and configured to electrically connect or disconnect the circuit board to or from at least a portion of the first housing.

13. The electronic device of claim 12, wherein the circuit is electrically connected to the flexible display.

14. The electronic device of claim 12, further comprising:
a processor,
wherein the processor is configured to control the switch to electrically connect or disconnect the circuit to or from the conductive portion of the second member.

15. The electronic device of claim 12, wherein the switch includes a semiconductor.

16. The electronic device of claim 12, wherein the third member is electrically connected to the second housing.

17. The electronic device of claim 12, further comprising:
a processor,
wherein the processor is configured to control the switch to be open in a state in which the flexible display is contracted.

18. A method of controlling an electronic device comprising:
controlling the electronic device to identify whether a flexible display is in an extended or a contracted state, wherein the electronic device includes: a first housing including a first conductive portion, a second conductive portion disposed to be spaced apart from one side of the first conductive portion, and a third conductive portion disposed to be spaced apart from another side of the first conductive portion, a second housing configured to perform slide movement with respect to the first housing, the flexible display connected to the second housing and configured to be extended or contracted in response to the slide movement, a first non-conductive member comprising a non-conductive material configured to electrically separate the first conductive portion and the second conductive portion from each other, a circuit board disposed inside the first housing and including a circuit disposed thereon, a fixing member comprising a conductive material configured to fix the circuit board to the first housing, and a switch disposed adjacent to the fixing member and configured to electrically connect or disconnect the circuit to or from at least a portion of the first housing, and
controlling the switch to be open or to be shorted based on whether the flexible display is in the contracted state or in the extended state.

19. The method of claim 18, wherein the switch is controlled to be open based on identifying that the flexible display is in the contracted state.

20. The method of claim 18, wherein the switch is controlled to be shorted based on identifying that the flexible display is in the extended state.

* * * * *